FLOATING TO REFERENCED OUTPUT CONVERSION

Filed April 1, 1964

INVENTOR.
RAYMOND T. MATSUMOTO
BY A. M. Fernandez
ATTORNEY

United States Patent Office 3,277,385
Patented Oct. 4, 1966

3,277,385

FLOATING TO REFERENCED OUTPUT CONVERSION

Raymond T. Matsumoto, Cypress, Calif., assignor to North American Aviation, Inc.

Filed Apr. 1, 1964, Ser. No. 356,457
5 Claims. (Cl. 330—14)

Figure 1:
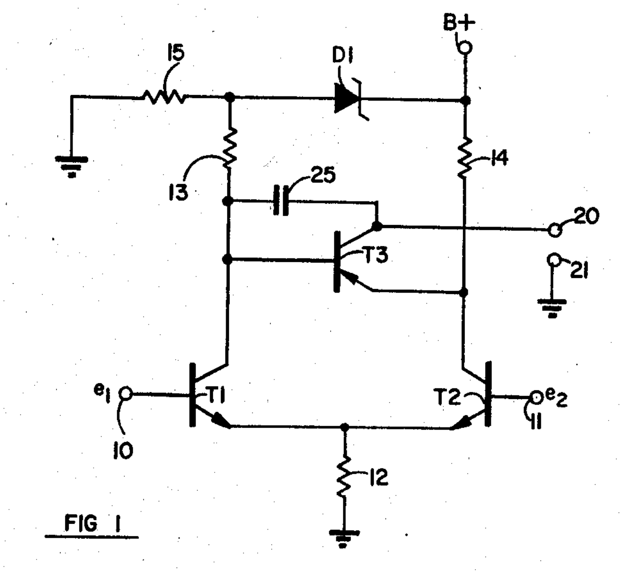

This invention relates generally to differential amplifiers, and more particularly to a means for sensing a floating or unreferenced signal in a differential amplifier and converting it to a signal referenced to a particular potential, such as ground.

Differential amplifiers are commonly used in electronic systems for widely diversified applications. The most common method of converting an unreferenced signal in a differential amplifier to a referenced signal is to sense the signal at only one side. However, errors may be introduced by that method because such a referenced output signal does not represent the difference in current between the two sides of the amplifiers in response to input signals applied to the control terminals thereof.

In a basic transitorized differential amplifier two transistors are provided, each with its emitter connected to a common current source. The input signals are applied to the base electrodes of the transistors and a floating output signal may be detected between the collector electrodes. Thus, when a difference exists between the two input signals, a proportional difference in the conduction of currents may be sensed at the collector electrodes. To detect that difference and provide a reference output signal in accordance with the commonly used method, a voltage signal is detected across a collector load resistor on only one side of the differential amplifier. A disadvantage of that method is that any change in the current source connected to the emitters of the transistors, or any change in leakage current of the transistors, or any change in the power supply of the differential amplifier is also detected as part of the referenced output signal.

The object of this invention is to provide a means for converting a floating or unreferenced output signal of a differential amplifier to a referenced output signal without loss of inherent and desirable characteristics of the differential amplifier.

Another object of this invention is to minimize errors incurred in converting a floating or unreferenced output of a differential amplifier to an output signal referenced to ground or any other reference potential.

These and other objects of the invention are achieved by connecting the collector electrodes of first and second transistors of a differential amplifier in series with separate load resistors and connecting the base and emitter electrodes of a third transistor to the respective collector electrodes of the first and second transistors. The resulting circuit is capable of detecting the difference in currents in the collectors of the differential amplifier transistors and indicating the total difference at the collector electrode of the third transistor without loss of desirable characteristics of the differential amplifier. If the load resistors are equal and the quiescent operating currents in the collector electrodes of the first and second transistors should for any reason increase or decrease, there will be a negligible change in current at the collector electrode of the third transistor. On the other hand, if there should be a change in current through the first and second transistors due to a difference in input signals applied to the base electrodes thereof, the difference is accurately reflected by the collector current of the third transistor.

Other objects and advantages of the invention will become apparent from the following description with reference to the drawing in which:

FIG. 1 is a circuit diagram of a differential amplifier providing a referenced output signal in accordance with the principles of this invention.

Figure 2:
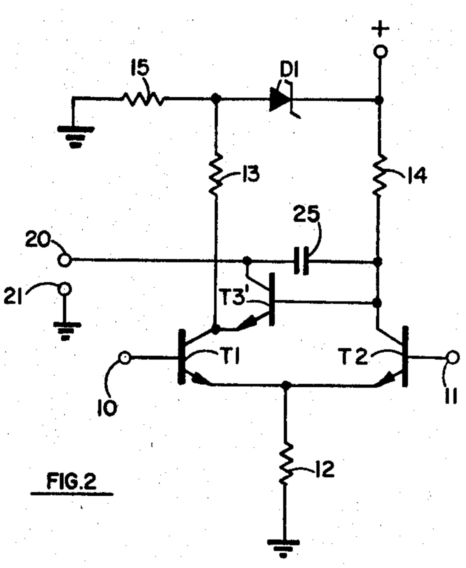

FIG. 2 is a circuit diagram of a second embodiment of the invention. In FIG. 1, the two input signals *e*1 and *e*2 to be compared are applied to a pair of input terminals 10 and 11 connected to the base electrodes of a pair of NPN transistors T1, T2. The emitter electrodes are connected to a constant current source, such as a high impedance resistor 12. The collector electrodes of the transistors T1 and T2 are connected to respective load resistors 13 and 14. The resistor 14 is connected directly to a source of positive potential while the resistor 13 is connected to a source of lower potential provided by a Zener diode D1 and a resistor 15. The base and emitter electrodes of a third transistor T3 are connected to the respective collectors of the transistors T1 and T2 to provide the referenced output signal *e* between a pair of output terminals 20, 21 connected to the collector of the third transistor T3 and a source of reference potential, respectively.

If the input signal *e*2 is assumed to be a constant reference voltage and the input signal *e*1 is a positive with respect to that voltage *e*2, it is desirable to obtain a proportional output signal *e* with respect to the reference potential to which the output terminal 21 is connected. To accomplish that, a PNP transistor is selected for the third transistor T3. However, an NPN transistor could also have been selected for the illustrated differential amplifier comprising NPN transistors by simply reversing the control connections as shown in FIG. 2 and emitter electrodes are connected to the collector electrodes of the transistors T2 and T1 respectively. The transistors T1 and T2 could also have been selected to be PNP transistors with the transistor T3 either a PNP or an NPN transistor. Such a selection would, of course, require a source of bias potential of a polarity opposite that shown. In other words, all of the transistors in the configuration of either FIG. 1 or FIG. 2 may be complemented by reversing the polarity of the power supply and reversing the connections of the diode D1.

The concept of this invention is simple and provides a high common-mode rejection ratio. High-frequency stabilization is provided with a capacitor 25 connected between the base and collector electrodes of the transistor T3 by modifying the gain phase characteristics of the circuit. High-frequency stabilization could also be achieved by connecting a resistor between the emitter of the transistor T3 and the collector of the transistor T2, and connecting separate capacitors between the collector electrodes of the transistor T1 and T2 and ground.

For a typical design of the invention, the Zener diode D1 is selected to provide a regulated voltage drop of approximately six volts or more. The resistor 15 is selected to have a value of resistance appropriate for biasing the Zener diode D1 as a voltage regulator and the resistor 14 is selected to provide a voltage at the emitter of the transistor T3 equal to the voltage provided by the Zener diode D1 when the transistor T1 is cut off. Thus, while the transistor T1 is cut off and the transistor T2 is conducting all the current supplied by resistor 12, the base electrode of the transistor T3 is biased at approximately the same potential as the emitter; therefore, T3 is cut off while the transistor T1 is cut off. The resistor 13 is selected to be equal to the resistor 14 in order that the output signal *e* be proportional to the input signal *e*1 at all times. Finally, the source of positive potential is selected to be large enough to keep the differential amplifier in class A operation over a maximum range. However, it may not be necessary to design the circuit for class A operation for many applications.

When the input signal *e*1 is sufficiently less than the input signal $e2$ so that the transistor T1 is cut off and the transistor T2 is conducting all the current supplied by resistor 12, the transistor T3 is cut off. Accordingly, when the input signal $e1$ is less than the input signal $e2$, the output signal $e$ is equal to zero. When the input signal $e1$ equals the input signal $e2$, both transistors T1 and T2 conduct equally. Accordingly, the collector current of each transistor is equal to approximately half the current of the source resistor 12, and the current to the output terminal 20 is equal to the total source current or twice the current of the collector of either one of the transistors T1 and T2. And finally, to consider the other extreme condition when the input signal $e1$ is sufficiently greater than the input signal $e2$ to cut off the transistor T2 all of the source current is conducted through the transistor T1. Under those conditions, the base-to-emitter junction of the transistor T3 is forward biased and the current to the output terminal 20 is equal to twice the source current, or twice the current ouput when the input signal $e1$ is equal to the output signal $e2$. For all values of $e1$ between the two extremes of cutting off the transistor T1 and cutting off the transistor T2, the current to the output terminal 20 is proportional to the difference between the input signals $e1$ and $e2$.

The operation of the circuit of FIG. 2 is similar. When the input signal $e1$ is sufficiently less than the input signal $e2$, the transistors T1 and T3 are cut off, and the current at the collector of the transistor T3 is equal to zero. At the opposite extreme, the transistor T1 conducts subsantially all of the source current and the transistor T2 is cut off; under those conditions, the collector current of the transistor T3 is equal to twice the source current. Between those extremes, the operation is class A. When the input signals $e1$ and $e2$ are equal, both transistors T1 and T2 conduct equally and the collector current of the third transistor is equal to the source current.

While the principles of the invention have now been made clear in an illustrative embodiment, many modifications which are particularly adapted for specific environments and operating requirements will be immediately obvious to those skilled in the art without departing from those principles. Therefore, the appended claims are intended to cover and embrace any such modifications within the limits of the true spirit and scope of the invention.

What is claimed is:

1. A circuit for sensing an unreferenced differential output signal from a differential amplifier and converting it to a signal referenced to a particular potential comprising:

first and second transistors having their emitters connected to a common source of current and their base electrodes adapted to be connected to respective first and second input signals, first impedance connecting the collector of one of said first and second transistors to a source of potential of a given amplitude and polarity, means for providing a bias potential of said given polarity but less than said given amplitude by an amount equal to the voltage drop across said first impedance when substantially all of said source current is flowing therethrough, second impedance substantially equal to said first impedance, said second impedance coupling the collector of the other one of said first and second transistors to said biasing means, and a third transistor having its base-emitter circuit connected between the collectors of said first and second transistors and its collector connected to an output terminal from which a referenced output signal is derived

2. In combination first and second transistors having their emitters connected to a common source of constant current, their base electrodes adapted to be connected to first and second input signals, and their collectors connected to first and second load impedances, said load impedances being substantially equal, a first source of bias potential of a given amplitude and polarity connected in series with one of said load impedances, a second source of bias potential of said given polarity, but less than said given amplitude by an amount substantially equal to the voltage drop across said one of said first and second load impedances when substantially all of said source current is flowing therethrough, said second source of bias potential being connected in series with the other one of said first and second impedances, and a third transistor having its base emitter circuit connected between the collectors of said first and second transistors, and its collector connected to an output terminal from which a referenced output signal is derived.

3. The combination as defined in claim 2 wherein said third transistor is complementary to said first and second transistors.

4. The combination as defined in claim 2 wherein said third transistor is of the same conductivity type as said first and second transistors.

5. The combination as defined in claim 2 wherein said second source of bias potential comprises a Zener diode connected to said first source of bias potential, and said diode being selected and so biased as to provide a voltage drop substantially equal to the voltage drop across said one of said first and second load impedances when substantially all of said source current is flowing therethrough.

References Cited by the Examiner

UNITED STATES PATENTS

| | | | |
|---|---|---|---|
| 2,296,920 | 9/1942 | Goodale | 330—116 X |
| 3,077,566 | 2/1963 | Vosteen. | |
| 3,173,023 | 3/1965 | Talsoe. | |
| 3,173,098 | 3/1965 | Peretz. | |

OTHER REFERENCES

Dargis: A High Performance Voltage Regulator, p. 75, Electronics, April 6, 1964, vol. 37, No. 13.

ROY LAKE, *Primary Examiner.*

F. D. PARIS, *Assistant Examiner.*